United States Patent
Boyer et al.

(10) Patent No.: US 9,573,564 B2
(45) Date of Patent: *Feb. 21, 2017

(54) REEL LOCK FOR PASSENGER RESTRAINT HAVING DUAL LOCKING POSITIONS

(75) Inventors: John Boyer, Yorba Linda, CA (US); Daniel Meggs, Las Vegas, NV (US); Alan Lane, Prescott, AZ (US)

(73) Assignee: Carleton Life Support Systems, Inc., Davenport, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,354

(22) Filed: Aug. 27, 2012

(65) Prior Publication Data

US 2013/0134251 A1   May 30, 2013

Related U.S. Application Data

(63) Continuation of application No. 12/361,581, filed on Jan. 29, 2009, now Pat. No. 8,251,304.

(60) Provisional application No. 61/024,409, filed on Jan. 29, 2008.

(51) Int. Cl.
  *B60R 22/38* (2006.01)
  *A62B 1/10* (2006.01)

(52) U.S. Cl.
  CPC ............. *B60R 22/38* (2013.01); *A62B 1/10* (2013.01); *B60R 2022/385* (2013.01)

(58) Field of Classification Search
  CPC ................................ B60R 22/38; B60R 2022/385
  USPC ............ 242/379.1, 381, 381.5, 383, 383.2, 383.4,242/383.5, 384, 384.5, 384.6, 384.7, 396.4,242/396.6; 280/805–807; 297/470, 476–478; 187/75, 231, 232, 234, 237, 239; 244/118.5, 121, 122 B, 122 AG, 122 R
  See application file for complete search history.

(56) References Cited

U.S. PATENT DOCUMENTS

| | | | | | |
|---|---|---|---|---|---|
| 2,791,397 | A | * | 5/1957 | Coffman | 182/239 |
| 3,240,510 | A | * | 3/1966 | Spouge | 180/268 |
| 4,083,511 | A | * | 4/1978 | Ikesue | 242/383.4 |
| 4,193,564 | A | * | 3/1980 | Lindblad | 242/384.4 |
| 4,381,086 | A | * | 4/1983 | Pfeiffer | 242/379.1 |
| 4,386,745 | A | * | 6/1983 | Patel et al. | 242/383.4 |
| 4,396,167 | A | * | 8/1983 | Loose | 242/381.4 |
| 4,401,282 | A | * | 8/1983 | Miki | 242/384.2 |
| 4,422,594 | A | * | 12/1983 | Honl | B60R 22/405 |
| | | | | | 242/383.4 |
| 4,801,105 | A | * | 1/1989 | Frisk | 242/383.4 |
| 4,917,325 | A | * | 4/1990 | Strnad | 242/383.4 |
| 4,925,124 | A | * | 5/1990 | Hoyt et al. | 242/383.4 |
| 5,127,598 | A | * | 7/1992 | Fujimura | 242/381.1 |
| 5,351,906 | A | * | 10/1994 | Feathers | 242/396.6 |
| 5,522,564 | A | * | 6/1996 | Schmidt et al. | 242/374 |
| 5,524,833 | A | * | 6/1996 | Modinger et al. | 242/379 |
| 5,526,996 | A | * | 6/1996 | Ebner et al. | 242/374 |

(Continued)

FOREIGN PATENT DOCUMENTS

EP   1 714 843   10/2006

*Primary Examiner* — Emmanuel M Marcelo
*Assistant Examiner* — Justin Stefanon
(74) *Attorney, Agent, or Firm* — Woods Oviatt Gilman LLP; Katherine H. McGuire, Esq.

(57) ABSTRACT

Disclosed is an improved reel assembly for use in conjunction with an occupant restraint system. The assembly employs a dual locking arrangement whereby an occupant can be restrained during both major and minor incidents. After a major incident, the reel assembly remains locked until the occupant disengages the reel via a push button. After a minor incident, the reel assembly can be conveniently unlocked, without the need for accessing the push button, by applying counter tension to the webbing.

11 Claims, 8 Drawing Sheets

(56) References Cited

U.S. PATENT DOCUMENTS

| | | | |
|---|---|---|---|
| 5,636,807 A * | 6/1997 | Warrick | 242/384 |
| 5,771,993 A * | 6/1998 | Anderson et al. | 182/239 |
| 5,921,496 A * | 7/1999 | Matsuki et al. | 242/383.2 |
| 2006/0237573 A1* | 10/2006 | Boelstler | B60R 22/405 |
| | | | 242/383.2 |
| 2006/0284012 A1* | 12/2006 | VanDruff et al. | 244/118.5 |

\* cited by examiner

REEL LOCK FOR PASSENGER RESTRAINT HAVING DUAL LOCKING POSITIONS

RELATED APPLICATION DATA

This application is a continuation of application Ser. No. 12/361,581 filed Jan. 29, 2009, and entitled "Reel Lock for Passenger Restraint Having Dual Locking Positions," which itself claims priority to provisional application Ser. No. 61/024,409 filed on Jan. 29, 2008 and entitled "Reel Lock for Passenger Restraint Having Dual Locking Positions," the contents of which are fully incorporated herein.

BACKGROUND OF THE INVENTION

Field of the Invention

This invention relates to reel lock for use in conjunction with a passenger restraint system. More particularly, the present invention relates to a reel assembly with dual locking mechanisms, whereby an occupant can be restrained during both major and minor events.

Description of the Background Art

The use of harness reels is known in the background art. For instance, U.S. Pat. No. 4,801,105 to Frisk discloses a reel assembly for retracting and locking a shoulder harness. The assembly includes a strap supporting spool affixed to a ratchet wheel. When a strap is rapidly pulled from the reel, an inertia mass turns with respect to the reel. This causes the inertia mass to move forward axially and trip a dog which locks the reel.

Likewise, U.S. Pat. No. 5,636,807 to Warrick discloses an acceleration sensor for an aircraft employing an inertia weight. The inertia weight is movable within a chamber by way of a linkage. The linkage is such that it provides the same output in response to movement of the aircraft in multiple directions.

Although these inventions each achieve their respective objectives, there continues to be a need in the art for a reel assembly with separate locking mechanisms that can be independently triggered and released in response to different events.

SUMMARY OF THE INVENTION

It is, therefore, one of the objects of this invention to provide a reel assembly with separate locking mechanisms.

It is another object of this invention to provide a reel with first and second locking mechanisms, wherein the first mechanism is triggered in response to major incidents and the second mechanism is triggered in response to minor incidents.

It is another object of the present invention to require a user to access a reset button to reset the reel after a major incident.

It is a further object of this invention to permit the reel assembly to be reset after a minor incident via the application of a counter tension to the harness webbing.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several views of the drawings.

| PARTS LIST | |
|---|---|
| 20 Reel Assembly | 22 Reel Housing |
| 24 Webbing | 26 Webbing Clasp |
| 28 Webbing Shaft | 32 Geared End Plate of Webbing Shaft |
| 34 Locking Ring | 36 Ramp on Locking Ring |
| 38 Trigger | 40 Spring Housings |
| 42 Locking Bolt | 44 Cut Out in Locking Bolt |
| 46 Housing for Locking Bolt | 48 Primary Locking Dog |
| 50 Locking Bolt Spring | 52 Sear |
| 54 Push Button | 56 Guard |
| 58 Pawls | 62 Calibration Springs |
| 64 Recesses on Locking Ring | 66 Accelerometer |

DETAILED DESCRIPTION OF THE PREFERRED EMBODIMENT

The present invention relates to an improved reel assembly for use in conjunction with the occupant restraint system of a vehicle. The assembly employs a dual locking arrangement whereby an occupant can be restrained during both major and minor incidents. After a major incident, such as a collision, the reel assembly remains locked until the occupant disengages the reel by accessing a push button. After a minor incident, such as a fall, the reel assembly can be conveniently unlocked, without the need for accessing the push button, by applying counter tension to the restraint webbing. The details of the present invention are more fully described hereinafter.

Figure 1:
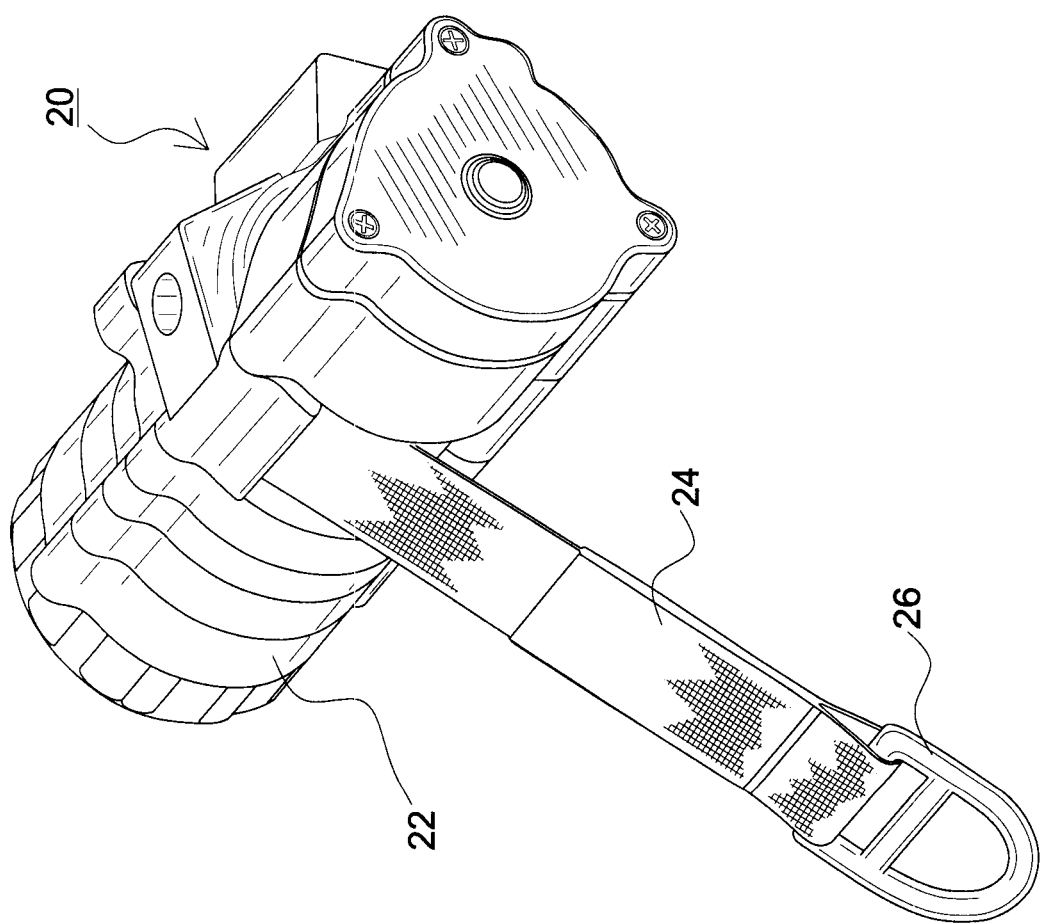
FIG. 1 is a perspective view of the reel assembly of the present invention.

With reference now to FIG. 1, the improved reel assembly of the present invention is illustrated. Reel assembly 20 includes a housing 22 that contains a length of webbing 24 and associated locking and winding mechanisms. These mechanisms control the extraction and retraction of webbing 24 and are more fully described hereinafter. An attachment 26, such as a clip, clasp or carabineer, can be attached to an end of webbing 24 and is used in securing webbing 24 to an occupant restraint, such as a waist belt or body harness.

Reel assembly 20 can be used in connection with any of a wide variety of vehicle restraint systems. For instance, reel assembly 20 can be used in association with the aircrew restraint system disclosed in U.S. Pat. No. 7,275,710 to Van Druff et. al., the contents of which are incorporated herein by reference. In this regard, reel assembly 20 includes one or more mounting apertures for securing the assembly to the inside of an aircrew compartment. The reel can likewise be readily secured within other vehicles, such as automobiles or boats.

When used in connection with a restraint system, reel assembly 20 serves to restrain occupants during both major and minor incidents. A "major incident" is generally defined as an event that results in more than 100 pounds of force being applied to webbing 24. A major incident, for example, may occur when a harnessed aircrew member encounters a rapid change in altitude or excessive G forces. By contrast, a "minor incident" is generally defined as an event that results in less than 100 pounds of force being applied to webbing 24. A minor incident, for example, may occur when a harnessed aircrew member trips or falls within the aircrew compartment. Reel assembly 20 employs two distinct locking mechanisms for minor and major incidents.

Figure 2:
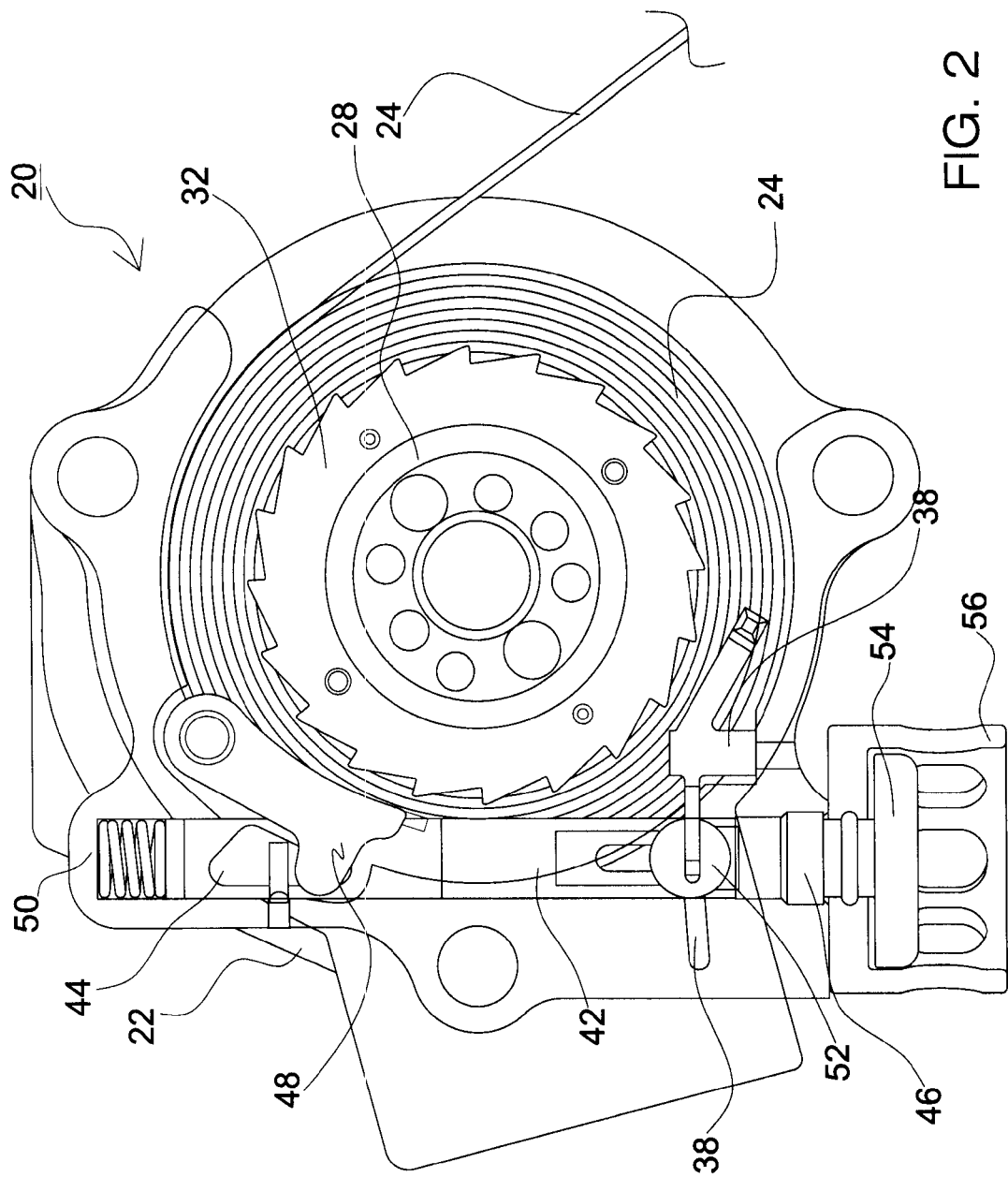
FIG. 2 is a cross sectional view illustrating the first locking mechanism of the reel assembly in the unlocked orientation.
Figure 3:
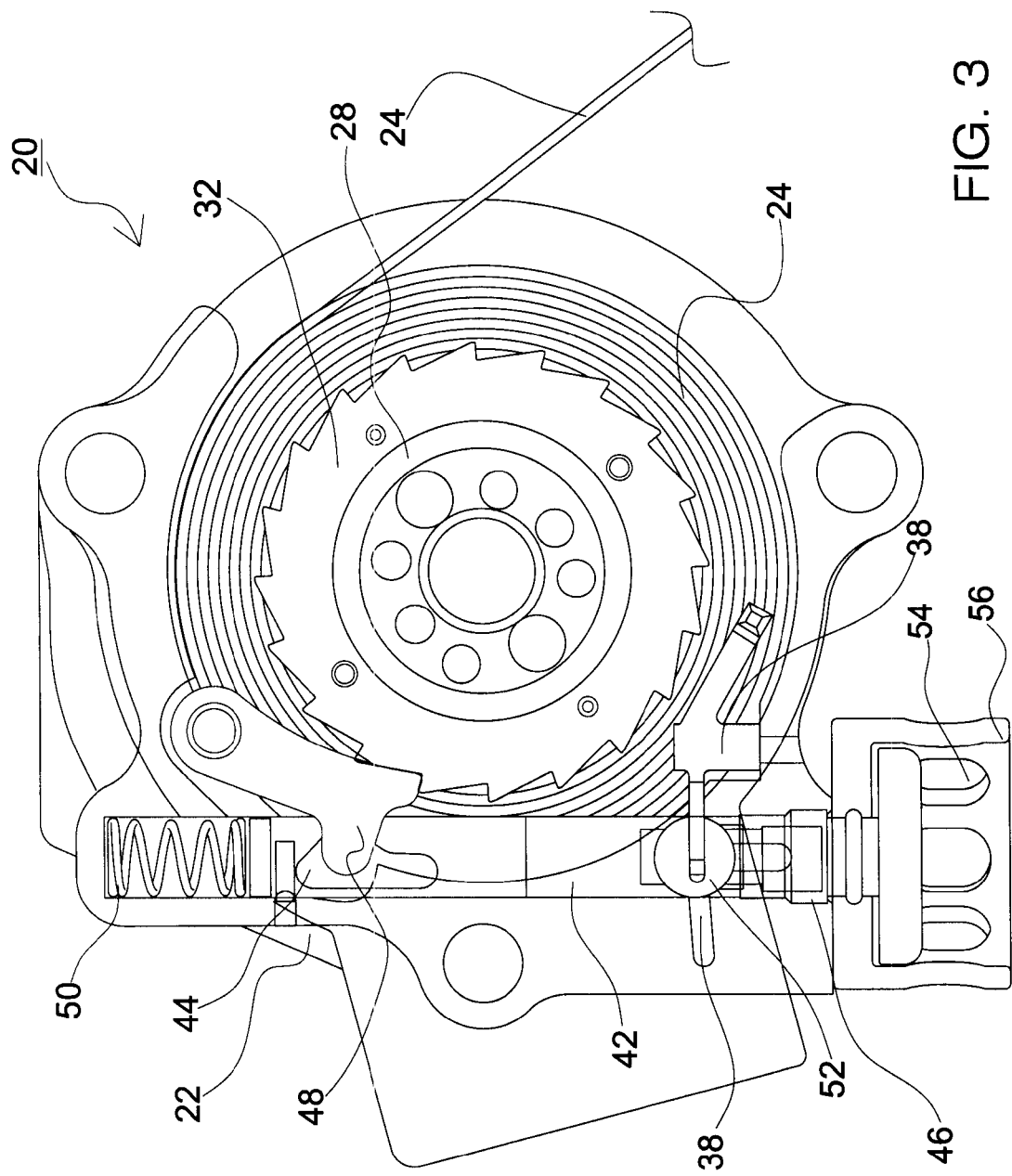
FIG. 3 is a cross sectional view of the first locking mechanism of the reel assembly in the locked orientation.

The first locking mechanism, which is actuated by major incidents, is illustrated in the cross-sectional views of FIGS. 2 and 3. As illustrated, the assembly includes shaft 28 about which webbing 24 can be wound or unwound. Shaft 28 includes a geared end plate 32. As noted in FIGS. 4 and 5, end plate 32 is secured in facing relation with a peripheral locking ring 34. In the absence of a major incident, end plate 32 rotates together with locking ring 34 as webbing 24 is extracted and retracted from shaft 28. However, during a major incident, locking ring 34 is free to rotate independently of shaft 28 and end plate 32. In other words, when forces greater than 100 pounds are applied to webbing 24, locking ring 34 sides along the face of end plate 32. In this regard, ring 34 and end plate 32 can be interconnected via a friction clutch that engages ring 34 and plate 32 during the less forceful extraction of webbing 24. Springs can also be used to provide a suitable interconnection. One such interconnection is described in U.S. Pat. No. 4,955,556 to Frisk, the contents of which are incorporated by reference herein. Whichever of these mechanisms is employed, the rapid withdrawal of webbing 24 causes locking ring 34 to rotate slightly behind the rotation of shaft 28. Ideally, the mechanism is such that the force necessary to cause the independent rotation of ring 34 is adjustable. In this manner, the threshhold necessary to trigger a major incident can be adjusted.

Figure 6:
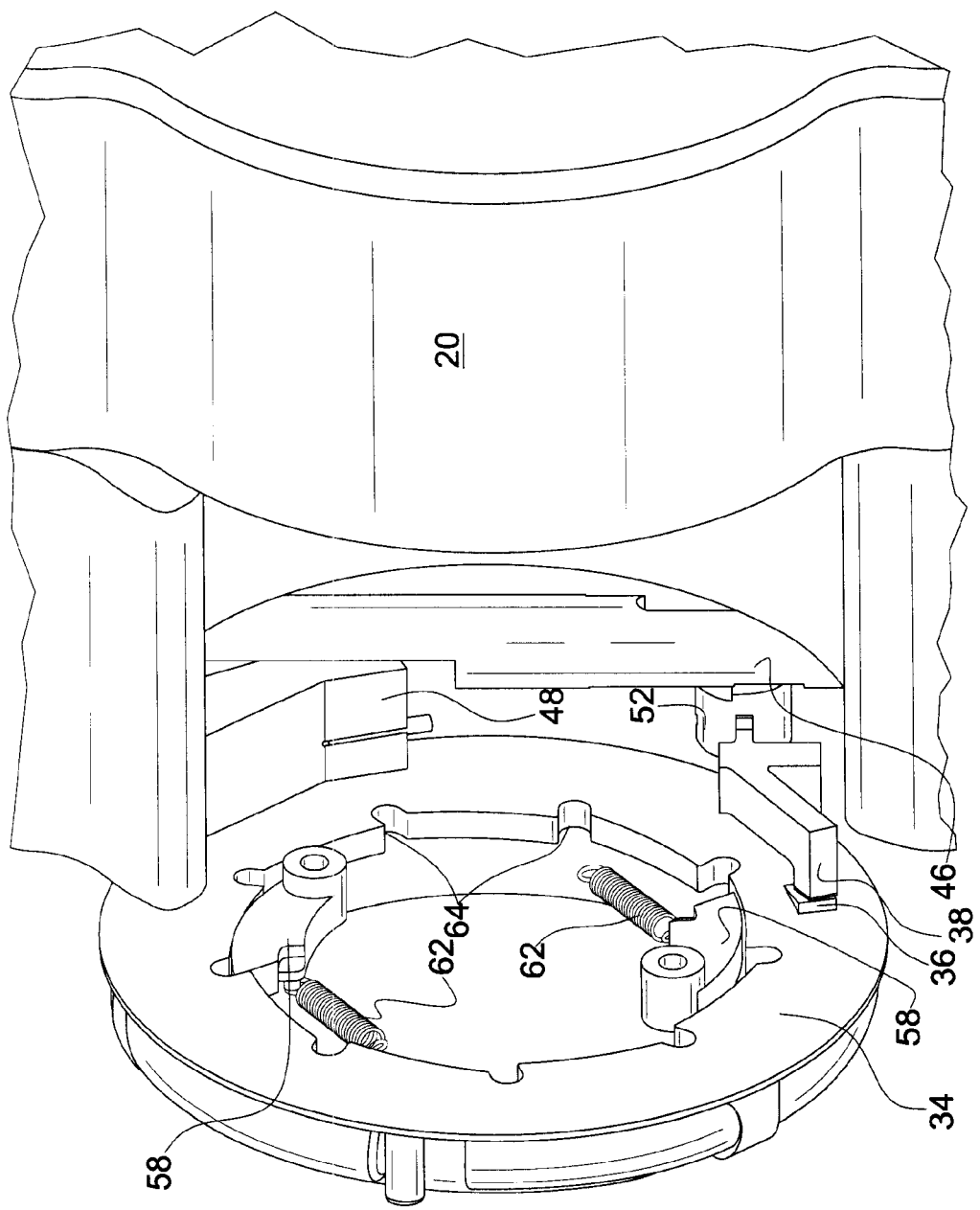
FIG. 6 is a partially exploded view of the reel assembly showing both the first and second locking mechanisms.
Figure 7:
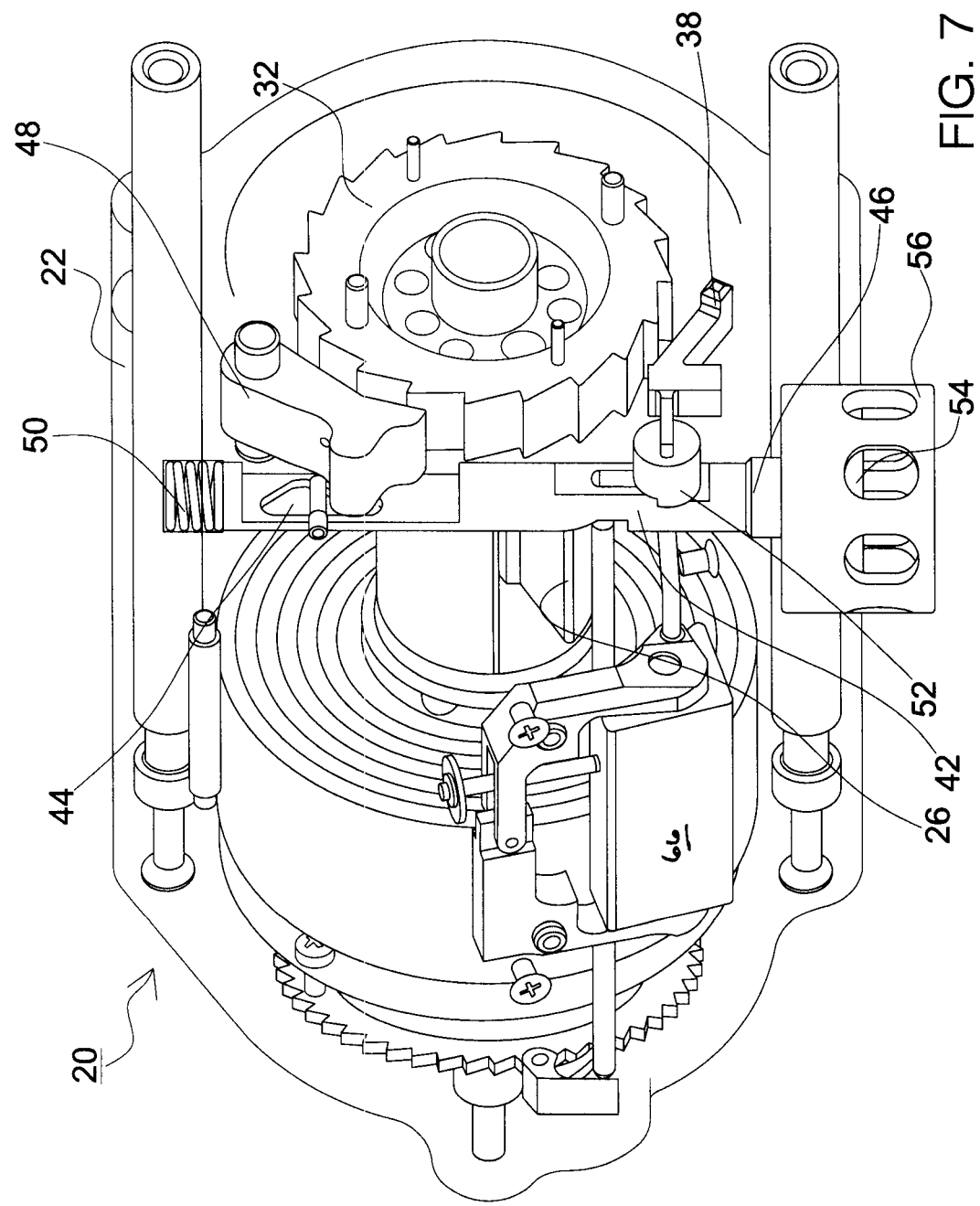
FIG. 7 is a perspective cut away view of the first locking mechanism assembly in the unlocked orientation.
Figure 8:
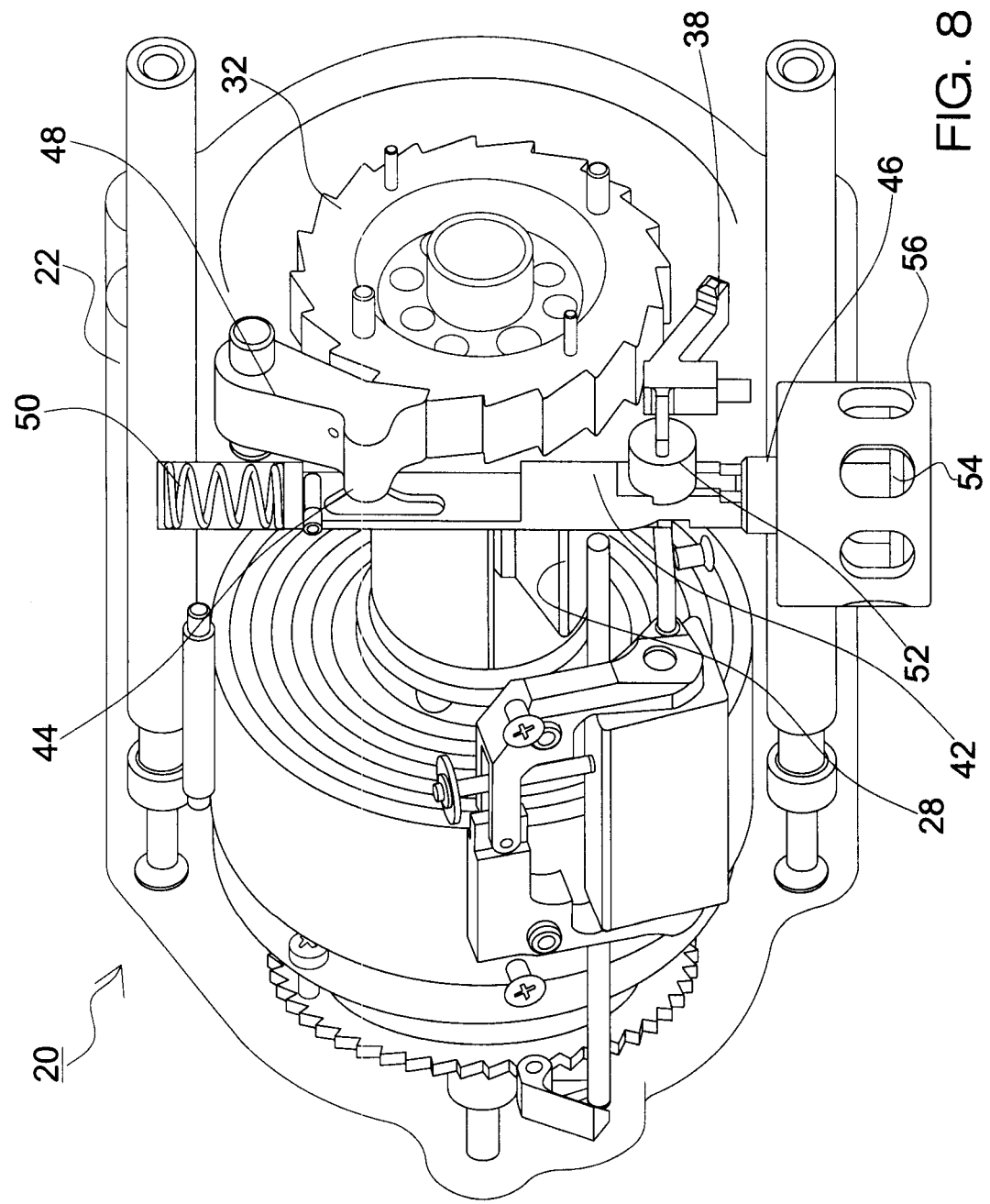
FIG. 8 is a perspective cut away view of the first locking mechanism in the locked orientation.

The first locking mechanism further includes a trigger 38 and an interconnected sear 52 that are positioned between ring 34 and shaft 28. Rotation of locking ring 34 relative to shaft 28 causes trigger 38 to engage an inclined ramp 36 on the inside face of ring 34. FIG. 6 illustrates trigger 38 engaging ramp 36 during the relative rotation of ring 34. This, in turn, results in the movement of both trigger 38 and an interconnected sear 52 in a direction parallel to the length of housing 20. Sear 52 is further interconnected to locking bolt 42. The movement of sear 52 permits locking bolt 42 to slide downwardly. As illustrated in FIGS. 7 and 8, bolt 42 includes a cutout 44 and is encased within housing 46.

With continuing reference FIGS. 7 and 8, bolt 42 is biased downwardly within housing 46 by spring 50. Thus, during a major incident, as trigger 38 engages ramp 40, sear 52 is moved axially with respect to bolt 42. This, in turn, permits bolt to move downwardly within housing 46 under bias of sprig 50. The sliding movement of bolt 42 triggers the pivotal movement of primary locking dog 48. More specifically, as bolt 42 slides downwardly, a portion of locking dog 48 encounters the enlarged portion of cutout 44. This, in turn, permits a spring to pivot locking dog 48 such that the distal end of the dog engages the teeth of geared end plate 32.

As further noted in FIGS. 7 and 8, the downward movement of bolt 42 also results in push button 54 being accessible within guard housing 56. Thus, after the occurrence of a major incident, webbing shaft 32 remains locked by way of locking dog 48, thereby prohibiting rotation of shaft 28 and the further extraction of webbing 24. This serves to restrain the movement of an occupant within the associated harness. Webbing shaft 28 remains locked until the occupant accesses and pushes button 54. By depressing button 54, bolt 42 is slid upwardly, thereby disengaging locking dog 48 and trigger 38. As a result, the first locking mechanism is reset and webbing 24 can again be extracted or retracted as noted above.

The second locking mechanism, which is activated by minor incidents, is described next in conjunction with FIGS. 4 and 5. These figures illustrate a series of pawls 58 that are pivotally mounted upon the face of the geared end plate 32. Although connected to plate 32, the distal ends of pawls 58 are adapted to engage recesses 64 that are peripherally located about the inner circumference of locking ring 34. Pawls 58 are maintained in a disengaged state by way of calibration springs 62. These springs 62 are interconnected between the end plate 32 and the distal ends of pawls 58. The force of the springs is such that the pawls 58 are maintained in their disengaged orientation until a predetermined centripetal force is encountered (i.e. upon occurrence of a minor incident). When such a force is encountered, pawls 58 are pivoted outwardly to engage recesses 64. This, in turn, will prevent rotation of shaft 28 and, thus, the further movement of the webbing 24. In this orientation, the occupant is restrained.

After the occurrence of a minor incident, pawls 58 can be reset by simply applying a counter tension to webbing 24. Namely, by pulling back on webbing 24 the distal ends of pawls 58 will be removed from recesses 64 and, thereafter, springs 62 will serve to rotate pawls 58 back into the disengaged orientation. Webbing shaft 32 is then free to rotate and the occupant can move freely within the aircraft.

Alternative Embodiment

A specific implementation of the present invention is next described in conjunction with FIGS. 1-8. As with the primary embodiment, this implementation includes dual locking mechanisms for restraining a vehicle occupant by controlling the displacement of a length of webbing (24) during both major and minor incidents. As is conventional, the webbing (24) includes a webbing clasp (26) at its distal end that can be releasably secured to a harness or other restraint system.

The webbing (24) is wound about a webbing shaft (28) within the interior of the reel assembly (20). As illustrated in FIG. 2, the shaft (28) includes a geared plate (32) at one end. A sufficient length of webbing (24) is included so as to permit the restrained occupant to travel throughout the vehicle. Rotation of the shaft (28) in a first sense results in the displacement of the webbing (24) and creation of sufficient slack so as to permit the free travel of the occupant within the vehicle. Likewise, rotation of the shaft (28) in the opposite sense results in slack being taken up so as to limit the movement of the occupant. As described in greater detail hereinafter, two distinct mechanisms are involved in preventing rotation of shaft (28). These mechanisms effectively restrain the occupant from any movement in the event the occupant falls (minor incident) or vehicle is involved in an accident (major incident).

Figure 4:
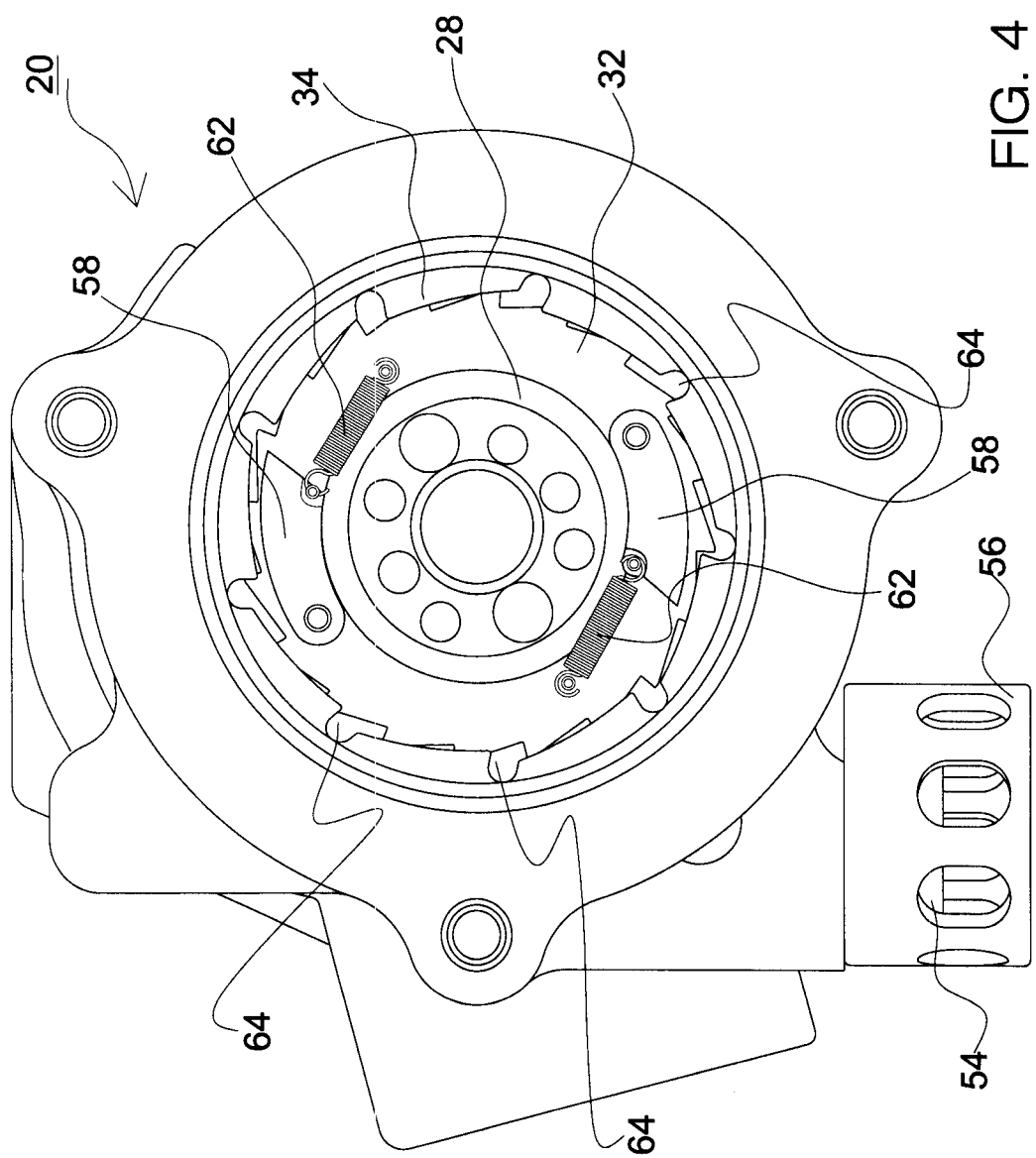
FIG. 4 is a cross sectional view of the second locking mechanism of the reel assembly in the unlocked orientation.
Figure 5:
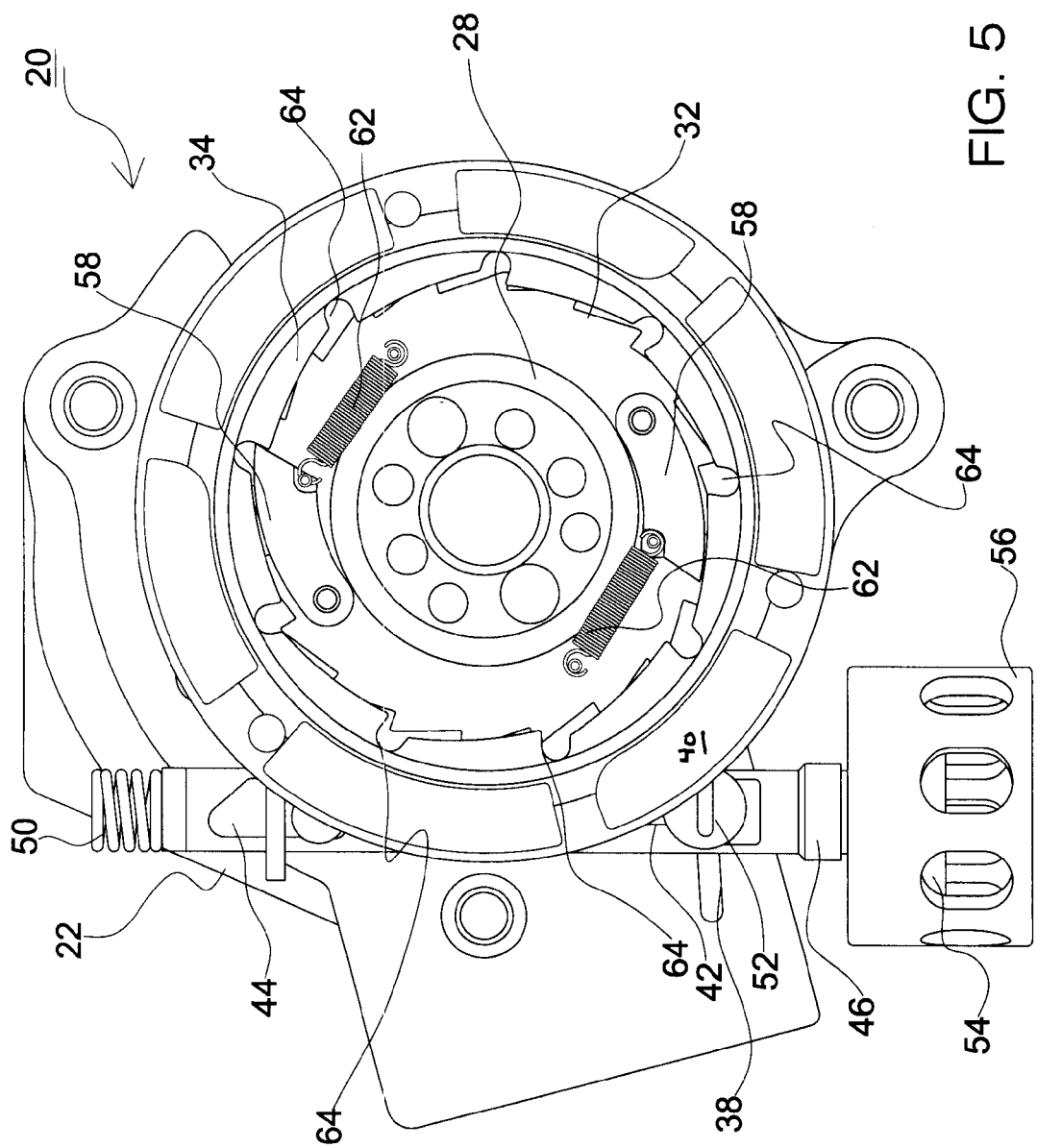
FIG. 5 is a cross sectional view of the second locking mechanism of the reel assembly in the locked orientation.

As illustrated in FIGS. 4 and 5, a pair of locking pawls (58) are pivotally secured to the geared end plate (32). FIG. 4 illustrates the pawls (58) in the unpivoted orientation and FIG. 5 illustrates the pawls (58) in the pivoted orientation. A calibration spring (62) is secured to each locking pawl (58) and serves to bias the pawl (58) into the unpivoted orientation. The bias of these spring can be overcome by centripetal acceleration whenever the webbing shaft (28) is rotated at a predetermined rate. When such forces are encountered, the pawls (58) are forced outwardly to the pivoted orientation whereby at least one of the pawls (58) engages a surrounding locking ring (34) (note FIG. 5).

As illustrated, locking ring (34) includes a geared inner periphery that is adapted to be engaged by one of the pawls (58). The locking ring (34) also includes an outer surface with an associated ramp (36) (note FIG. 6). The function of this ramp is described in greater detail hereinafter. Locking ring (34) is positioned around the geared end plate (32) and is independently rotatable relative thereto. However, the locking ring (34) and the locking pawl (58) rotate together whenever one of the locking pawls (58) is engaged with the geared inner periphery of the locking ring (34). When this occurs, rotation of the webbing shaft (28) causes a corresponding rotation of the locking ring (34). Spring compartments (40) and internal springs are included to resist the rotation of the locking ring (34).

The operation of the locking bolt (42) is described next in association with FIGS. 7 and 8. Locking bolt (42), which includes an elongated cutout (44) along its length, is positioned adjacent the webbing shaft (28). Locking bolt (42) has both an engaged and a disengaged position. A spring (50) is used to bias the locking bolt (42) into the engaged position. With continuing reference to FIGS. 7 and 8, trigger (38) and a sear (52) are operatively coupled to the locking bolt (42) and operate to keep the locking bolt (42) in either its disengaged or its engaged orientation. More specifically, sear (52) engages the lower extent of locking bolt (42) and maintains it in the disengaged position against the bias of the spring (50).

With reference to FIG. 6, it can be seen that trigger (38) is adapted to engage the ramp (36) on the outer surface of the locking ring (34) during the extended rotation of locking ring (34). Namely, trigger (38) engages ramp (36) whenever locking ring (34) is rotated more than 45 degrees. When this occurs, both trigger (38) and sear (52) are pivoted such that sear (52) temporarily disengages the locking bolt (42). This displacement of sear (52) permits spring (50) to force locking bolt (42) into the engaged position. This movement of the locking bolt (42), in turn, permits a locking dog (48) to engage geared end plate (32) so as to prohibit further displacement of webbing (24).

The locking dog (48) is pivotally secured adjacent the geared end plate (32) and has a distal end that rides within the elongated cut out (44) of the locking bolt (42). As noted in FIG. 7, the elongated cut out (44) prevents the locking dog (48) from engaging the geared end plate (32) when the locking bolt (42) is in the disengaged position. However, when the locking bolt (42) is in the engaged position, the geometry of the elongated cut out (44) allows the locking dog (48) to engage the geared end plate (32), as depicted in Figure B. With the locking dog (48) so engaged, the webbing (24) is prevented from being displaced from the webbing shaft (28) and the occupant is effectively restrained.

In operation, rotation of the webbing shaft (28) at a predetermined rate causes the locking pawls (58) to move into the pivoted orientation and engage the locking ring (34). This restricts the displacement of the webbing (24) from the webbing shaft (28) and restrains the occupant. This level of restraint is triggered during minor incidents, such as when the occupant trips or falls. Locking pawls (58) remain engaged within locking ring (34) as long as tension remains in the webbing. The locking pawls (58) can be disengaged by applying a counter tension to the webbing (24) to reset the assembly.

During major incidents, such a vehicle accident, the force on the webbing (24) will cause the locking pawls (58) to engage locking ring (34) and will further cause the locking ring (34) to rotate 450 or more. This rotation, in turn, causes trigger (38) to engage ramp (36), whereby sear (52) will be displaced. As noted in FIG. 8, spring (50) will thereafter be permitted to move the locking bolt (42) into the engaged position such that the locking dog (48) engages the geared end plate (32). With the locking dog (48) fully engaged, further displacement of the webbing (24) is prevented and the occupant is fully restrained. Thus, during major incidents, an occupant is fully restrained. The user can thereafter release the locking dog (48) via a push button at the end of locking bolt (42). In addition to the foregoing, trigger (38) can also be tripped by a separate accelerometer (64). This accelerometer (64) provides a separate and independent means of triggering locking dog (48) and preventing the rotation of webbing shaft (28) during major incidents.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A reel assembly (20) for controlling the displacement of webbing (24) comprising:
   a webbing shaft (28) with a geared end plate (32) rotatably mounted within a housing, the webbing (24) being wound about the webbing shaft (28), with displacement of the webbing (24) being controlled by rotation of the webbing shaft (28);
   at least one locking pawl (58) pivotally secured to the geared end plate (32), the at least one locking pawl (58) having pivoted and unpivoted orientations, a calibration spring (62) secured to a respective locking pawl (58), the calibration spring (62) having a bias that functions to urge the respective pawl (58) into the unpivoted orientation, the bias being overcome when a force having a first magnitude is applied to the webbing shaft (28), whereby the respective pawl (58) is moved to the pivoted orientation; and
   a locking ring (34) having a geared inner periphery, the locking ring (34) positioned around and independently rotatable relative to the geared end plate (32), the respective locking pawl (58) engaging the geared inner periphery of the locking ring (34) when the respective pawl (58) is in the pivoted orientation, whereby when the force having the first magnitude is applied to the webbing shaft, rotation of the webbing shaft (28) is arrested solely by the engagement of the respective locking pawl (58) with the inner periphery of the locking ring (34); and a locking dog (48) that lockingly engages the geared end plate (32) to prevent displacement of the webbing (24) upon independent rotation of the locking ring (34) when a force having a second magnitude is applied to the webbing shaft, wherein the second magnitude is greater than the first magnitude.

2. The reel assembly as described in claim 1 further comprising:

a locking bolt (42) positioned adjacent the webbing shaft (28), the locking bolt (42) having engaged and disengaged positions, with the webbing (24) prevented from displacement with the locking bolt (42) in the engaged position.

3. The reel assembly as described in claim 2 further comprising:

a trigger (38) for bringing the locking bolt (42) into the engaged position upon independent rotation of the locking ring (34) when a force having a second magnitude is applied to the webbing shaft.

4. The reel assembly as described in claim 3 further comprising:

a locking dog (48) that is pivotally secured adjacent the geared end plate (32), the locking dog (48) disengaged from the geared end plate (32) when the locking bolt (42) is in the disengaged position and the locking dog (48) engaged with the geared end plate (32) when the locking bolt is in the engaged position, with the locking dog (48) in engagement with the geared end plate (32) the webbing (24) is prevented from being displaced from the webbing shaft (28).

5. The reel assembly as described in claim 4 wherein locking bolt (42) includes an elongated cut out (44) and wherein the locking dog (48) includes a distal end that rides within the elongated cut out (44), whereby the geometry of the elongated cut out (44) forces the locking dog (48) into engagement with the geared end plate (32) when the locking bolt is in the engaged position.

6. The reel assembly as described in claim 3 further comprising an accelerometer that can engage the trigger (38) upon application of the force having the second magnitude.

7. A reel assembly (20) for controlling the displacement of webbing (24) comprising:

a webbing shaft (28) with an end plate (32) rotatably mounted within a housing, the webbing (24) being wound about the webbing shaft (28);

a pawl (58) pivotally secured to the end plate (32), the pawl (58) having locked and unlocked orientations, the pawl (58) being brought to the locked orientation when a force having a first magnitude is applied to the webbing shaft (28);

a locking ring (34) having an inner periphery, the locking ring (34) positioned around and independently rotatable relative to the end plate (32), whereby when the force having the first magnitude is applied to the webbing shaft, rotation of the webbing shaft (28) is arrested solely by engagement of the pawl (58) with the inner periphery of the locking ring (34); and a locking dog (48) that lockingly engages the geared end plate (32) to prevent displacement of the webbing (24) upon rotation of locking ring (34) when a force having a second magnitude is applied to the webbing shaft, wherein in the second magnitude is greater than the first magnitude.

8. The reel assembly (20) as described in claim 7 wherein both the end plate (32) and the locking ring (34) are geared.

9. The reel assembly (20) as described in claim 7 wherein the end plate (32) and locking ring (34) rotate independently of one another when the force having the second magnitude is applied to the webbing shaft.

10. The reel assembly (20) as described in claim 7 further comprising a calibration spring (62) secured to the pawl (58), the calibration spring (62) having a bias that functions to urge the pawl (58) into the unlocked orientation, the bias being overcome when the force having the first magnitude is applied to the webbing shaft (28), whereby the pawl (58) is moved to the locked orientation.

11. The reel assembly (20) as described in claim 7 further comprising an accelerometer that is used in triggering the locking dog (48).

* * * * *